US007929657B2

(12) United States Patent
Muller et al.

(10) Patent No.: US 7,929,657 B2
(45) Date of Patent: Apr. 19, 2011

(54) PRESSURISED WATER NUCLEAR REACTOR VESSEL

(75) Inventors: Thierry Muller, St Helene (FR); Philippe Dolleans, Rueil Malmaison (FR); Fabien Hensch, Paris (FR)

(73) Assignee: Areva NP, Courbevoie (FR)

( * ) Notice: Subject to any disclaimer, the term of this patent is extended or adjusted under 35 U.S.C. 154(b) by 900 days.

(21) Appl. No.: 11/591,575

(22) Filed: Nov. 2, 2006

(65) Prior Publication Data

US 2007/0177709 A1 Aug. 2, 2007

(30) Foreign Application Priority Data

Nov. 4, 2005 (FR) ..................................... 05 11271

(51) Int. Cl.
*G21C 15/00* (2006.01)
*G21C 15/24* (2006.01)
(52) U.S. Cl. ....................................... 376/352; 376/294
(58) Field of Classification Search .......................... None
See application file for complete search history.

(56) References Cited

U.S. PATENT DOCUMENTS

| 3,821,079 | A |   | 6/1974 | Jabsen |   |
|---|---|---|---|---|---|
| 3,850,795 | A |   | 11/1974 | Thome |   |
| 4,192,716 | A |   | 3/1980 | Anthony |   |
| 4,960,561 | A | * | 10/1990 | Gerard et al. | 376/352 |
| 5,267,285 | A |   | 11/1993 | Ekeroth et al. |   |
| 2007/0133732 | A1 | * | 6/2007 | Nakayama et al. | 376/352 |

FOREIGN PATENT DOCUMENTS

| EP | 1 006 533 | 6/2000 |
|---|---|---|
| GB | 2 015 778 | 9/1979 |

* cited by examiner

*Primary Examiner* — Johannes P Mondt
(74) *Attorney, Agent, or Firm* — Connolly Bove Lodge & Hutz LLP

(57) ABSTRACT

The invention relates to a pressurised water nuclear reactor vessel, comprising:
- an outer casing which comprises at least one cylindrical shell and a dished bottom head,
- a core support plate, a vessel bottom head space being delimited between the support plate and the dished bottom head, the support plate being perforated with holes for circulation of the primary coolant which place the vessel bottom head space in communication with the core,
- a calming device which is arranged in the vessel bottom head space, wherein the calming device comprises at least one calming plate which is substantially perpendicular relative to the centre axis of the vessel and a plurality of calming holes, the calming holes being provided in the calming plate and being capable of calming the primary coolant by passing the fluid through the holes.

14 Claims, 3 Drawing Sheets

PRESSURISED WATER NUCLEAR REACTOR VESSEL

FIELD OF THE INVENTION

The invention generally relates to pressurised water nuclear reactors.

More precisely, the invention relates to a pressurised water nuclear reactor vessel, of the type comprising:
- an outer casing which comprises at least one cylindrical shell having a circular cross-section, with a vertical centre axis, and a dished bottom head which closes a lower end of the shell,
- at least one inlet and outlet for a primary cooling fluid, which are arranged in the fabricated casing,
- a core comprising a plurality of nuclear fuel assemblies, arranged inside the fabricated casing,
- a core support plate which is substantially perpendicular relative to the centre axis and which is arranged inside the fabricated casing beneath the core, a vessel bottom head space thus being delimited between the support plate and the dished bottom head, the support plate being perforated with holes for circulation of the primary coolant which place the vessel bottom head space in communication with the core,
- means for channelling the primary coolant from the inlet(s) as far as the vessel bottom head space,
- a calming device which is arranged beneath the support plate in the vessel bottom head space and which is capable of calming at least a portion of the primary coolant conveyed by the channelling means before this fluid passes through the support plate, the calming device having, in directions perpendicular relative to the centre axis, dimensions of between 30% and 60% of the inner diameter of the shell.

BACKGROUND OF THE INVENTION

A vessel of this type is known from EP-A-1 006 533 which describes calming means which substantially comprise a cylindrical shell which is coaxial relative to the centre axis of the vessel.

These calming means provide very good results.

However, if the primary coolant forms small vortexes, these can pass through the inner space of the shell without being broken.

In this context, the object of the invention is to provide a nuclear reactor vessel which is provided with a calming device which has an improved level of efficiency, in particular when small vortexes are formed in the primary coolant.

SUMMARY OF THE INVENTION

To this end, the invention relates to a nuclear reactor vessel of the above-mentioned type, wherein the calming device comprises at least one calming plate which is substantially perpendicular relative to the centre axis, and a plurality of calming holes, the calming holes being provided in the calming plate and being capable of calming the primary coolant by passing it through the holes.

The vessel may also have one or more of the following features, taken individually, or according to any technically possible combination:
- the calming plate has, along the centre axis, a height of between 15% and 40% of the maximum height of the vessel bottom head space, taken along this axis;
- the calming plate is unitary;
- the calming plate is a machined forged component;
- the calming holes extend through the calming plate parallel with the centre axis and are distributed in the manner of a square-mesh grid;
- the calming holes have a square cross-section perpendicularly relative to the centre axis;
- the calming holes are delimited at least by a first set of mutually parallel blades which belong to the calming plate, and by a second set of mutually parallel blades which belong to the calming plate, the blades of the first set being perpendicular relative to the blades of the second set;
- the blades are straight and each extend through the entire calming plate in a direction which is perpendicular relative to the centre axis;
- the fuel assemblies are arranged in the core in accordance with a square-mesh grid having a predetermined side measurement, the blades of the first set being arranged in accordance with a whole multiple constant pitch of half of the side, the blades of the second set also being arranged in accordance with a whole multiple constant pitch of half of the side;
- the blades have a thickness of between 5 and 50 millimetres;
- the calming device comprises columns for fixing the calming plate to the core support plate, these columns being rigidly fixed to nodes of the calming plate which are provided at the intersection of blades of the first and second assemblies;
- the calming plate has, along the centre axis, a height of between 0.3 and 3.5 times the largest dimension of the cross-section of the calming holes, taken perpendicularly relative to the centre axis;
- the calming device comprises a cylindrical portion which surrounds the calming plate and which is fixedly joined to the outer edge of the calming plate; and
- the cylindrical portion extends along the centre axis beyond the calming plate towards the core support plate, over a height of between 25% and 100% of the height of the calming plate.

BRIEF DESCRIPTION OF THE DRAWINGS

Other features and advantages of the invention will be appreciated from the description which is given below, in an exemplary and non-limiting manner, with reference to the appended Figures, in which.

DETAILED DESCRIPTION

Figure 1:
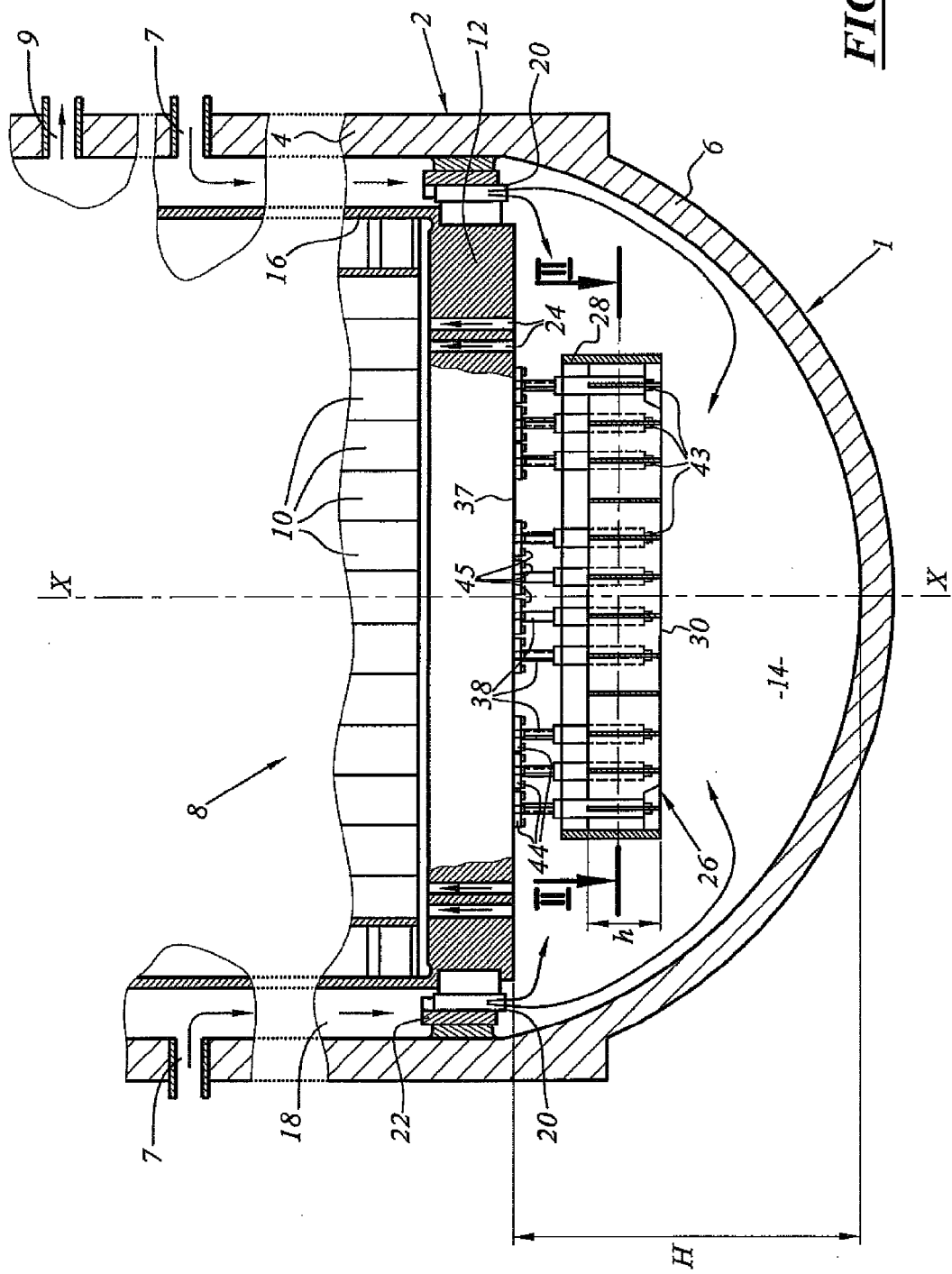
FIG. 1 is an axial section of a lower portion of a nuclear reactor vessel according to the invention.

The vessel 1 illustrated in FIG. 1 is a pressurised water nuclear reactor vessel. It comprises a fabricated outer casing 2 which comprises a cylindrical shell having a circular cross-section 4 having a vertical centre axis X, a dished bottom head 6 which closes an open lower end of the shell 4, and a cover (not illustrated) which is removably fixed to an open upper end of the shell 4. The shell 4 generally comprises a plurality of cylindrical shell elements which are butt welded.

The vessel 1 also comprises a plurality of primary cooling fluid inlets 7 which are arranged in the fabricated casing 2, and a plurality of outlets 9 for the same fluid which are also arranged in the fabricated casing 2.

The vessel 1 comprises a core 8 which comprises a plurality of nuclear fuel assemblies 10 which are arranged vertically inside the fabricated casing 2. It also comprises a core support plate 12 which is substantially perpendicular relative to the centre axis X and which is arranged inside the fabricated casing 2, below the core 8. The plate 12 extends below the cylindrical shell 4, a vessel bottom head space 14 thus being delimited between the support plate 12 and the dished bottom head 6.

The vessel 1 also comprises a cylindrical core casing 16 which has a circular cross-section having an axis X and which is arranged around the core 8. The casing 16 is thus interposed between the core 8 and the cylindrical shell 4, and has a smaller diameter than this shell. The casing 16 thus defines with the shell 4 an annular space 18 which is capable of channelling almost all the primary coolant from the inlets as far as the vessel bottom head space 14.

The support plate 12 has a diameter which is substantially equal to that of the casing 16, and is welded over the entire periphery thereof to an open lower end of the casing 16.

The casing 16 itself is suspended on the upper edge of the shell 4 using suitable means which will not be described in this instance.

As illustrated in FIG. 1, the support plate 12 carries, at the periphery thereof, a plurality of radial indexing keys 20, these keys being engaged in guiding grooves 22 which are fixed to the inner side of the shell 4.

The keys 20 co-operate with the grooves 22 in order to index the support plate 12 and the casing 16 in terms of rotation about the centre axis X.

The nuclear fuel assemblies 10 of the core 8 rest on the support plate 12 by means of their lower ends (not illustrated). They are arranged vertically parallel with each other, in the manner of a square-mesh grid. The size of the square mesh is constant over the entire grid. Each square has, for example, sides measurement of approximately 215 mm.

The support plate 12 is perforated with holes 24 for circulation of the primary coolant which place the vessel bottom head space 14 in communication with the core 8. These holes extend along the centre axis X and extend through the support plate 12 over the entire thickness thereof. The holes 24 are also arranged in the plate 12 in the manner of a square-mesh grid which is arranged in such a manner that four holes 24 are located below each assembly 10. The four holes occupy the extremities of one mesh of the grid.

This result is achieved by arranging the holes 24 in a grid, all the square meshes of which are substantially of the same size, the side of each mesh being approximately half of the side of the mesh of the grid of fuel assemblies.

The mesh of the grid of holes 24 therefore has a surface equal to one quarter of the mesh of the grid of fuel assemblies.

The vessel 1 further comprises a calming device 26, which is arranged below the support plate 12 in the vessel bottom head space 14 and which is fixed to the support plate. This device is capable of calming at least a portion of the primary coolant which is channelled downwards via the annular space 18 as far as the vessel bottom head space 14 before this fluid passes upwards through the support plate 12 in order to be introduced into the core 8.

Figure 2:
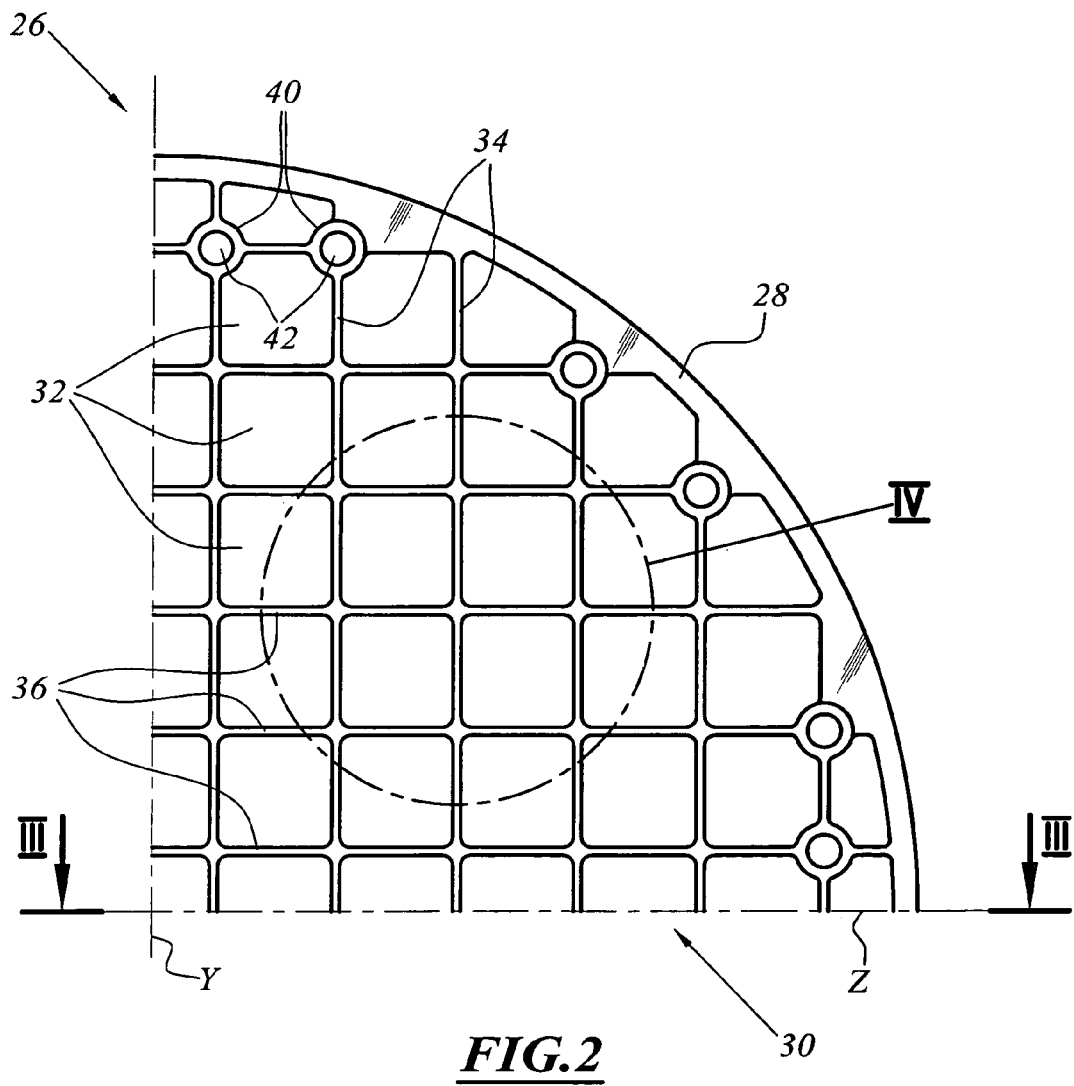
FIG. 2 is a sectioned view taken perpendicularly relative to the centre axis of the calming plate of FIG. 1, viewed according to the incidence of the arrows II of FIG. 1, only a quarter of the plate being illustrated.
Figure 3:
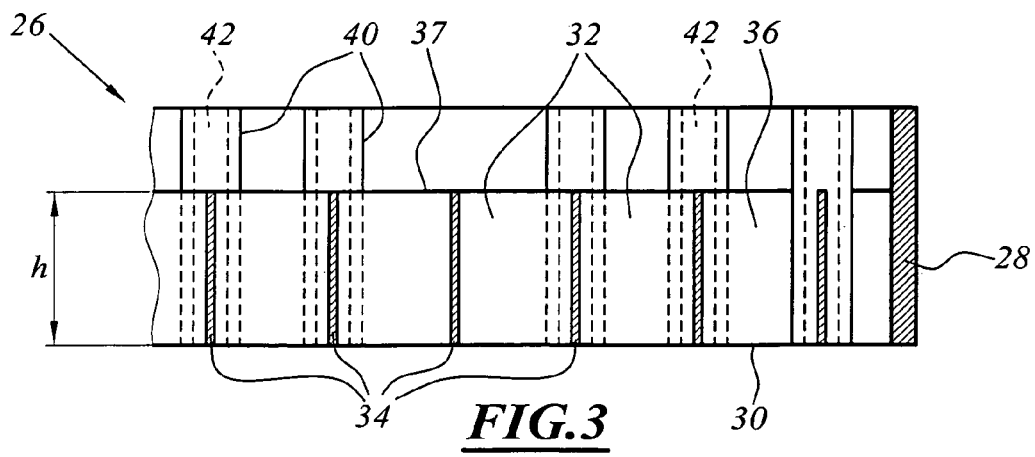
FIG. 3 is an axial section of the calming device of FIG. 2, viewed according to the incidence of the arrows III of FIG. 2, only half of this device being illustrated.

In a first embodiment, illustrated in FIGS. 1 to 3, the calming device is a machined, forged unitary assembly, comprising an outer cylindrical portion 28 having a circular cross-section, having an axis X and a calming plate 30 which is substantially perpendicular relative to the axis X and which occupies the entire inner cross-section of the cylindrical portion 28. The portion 28 therefore completely surrounds the plate 30 and is fixedly joined to the outer edge of the calming plate 30.

As illustrated in FIG. 2, the calming device 26 comprises a plurality of calming holes 32 which are arranged in the plate 30 and which are arranged in the manner of a square-mesh grid. These holes 32 are delimited by a first set of mutually parallel blades 34 which belong to the calming plate 30 and by a second set of mutually parallel blades 36 which belong to the calming plate 30. The blades 34 of the first set are perpendicular relative to the blades 36 of the second set. The blades 34 and 36 extend over the entire height of the plate 30, the height being taken in this instance parallel with the centre axis X.

The blades 34 and 36 are straight and each extend through the entire calming plate 30, in a direction perpendicular relative to the centre axis X. The blades 34 extend in the direction designated Y in FIG. 2 and the blades 36 in the direction designated Z in FIG. 2. The blades 34 and 36 are fixedly joined to the cylindrical portion 28 at the two opposing ends thereof. The blades 34 intersect with the blades 36 at intersection points which will be referred to below as nodes, the blades 34 thus being fixedly joined to the blades 36 at each node and over the entire height of the calming plate 30.

The blades 34 of the first set are arranged so as to be spaced apart from each other at a constant pitch equal to the sides of the meshes of the fuel set grid 10. In the same manner, the blades 36 of the second set are also arranged in accordance with a constant pitch equal to the side of the meshes of the fuel assembly grid.

The positions of the blades 34 and 36 are fixed so that, taken along the centre axis X, the blades are arranged between the circulation holes 24 of the core support plate 12.

Figure 4:
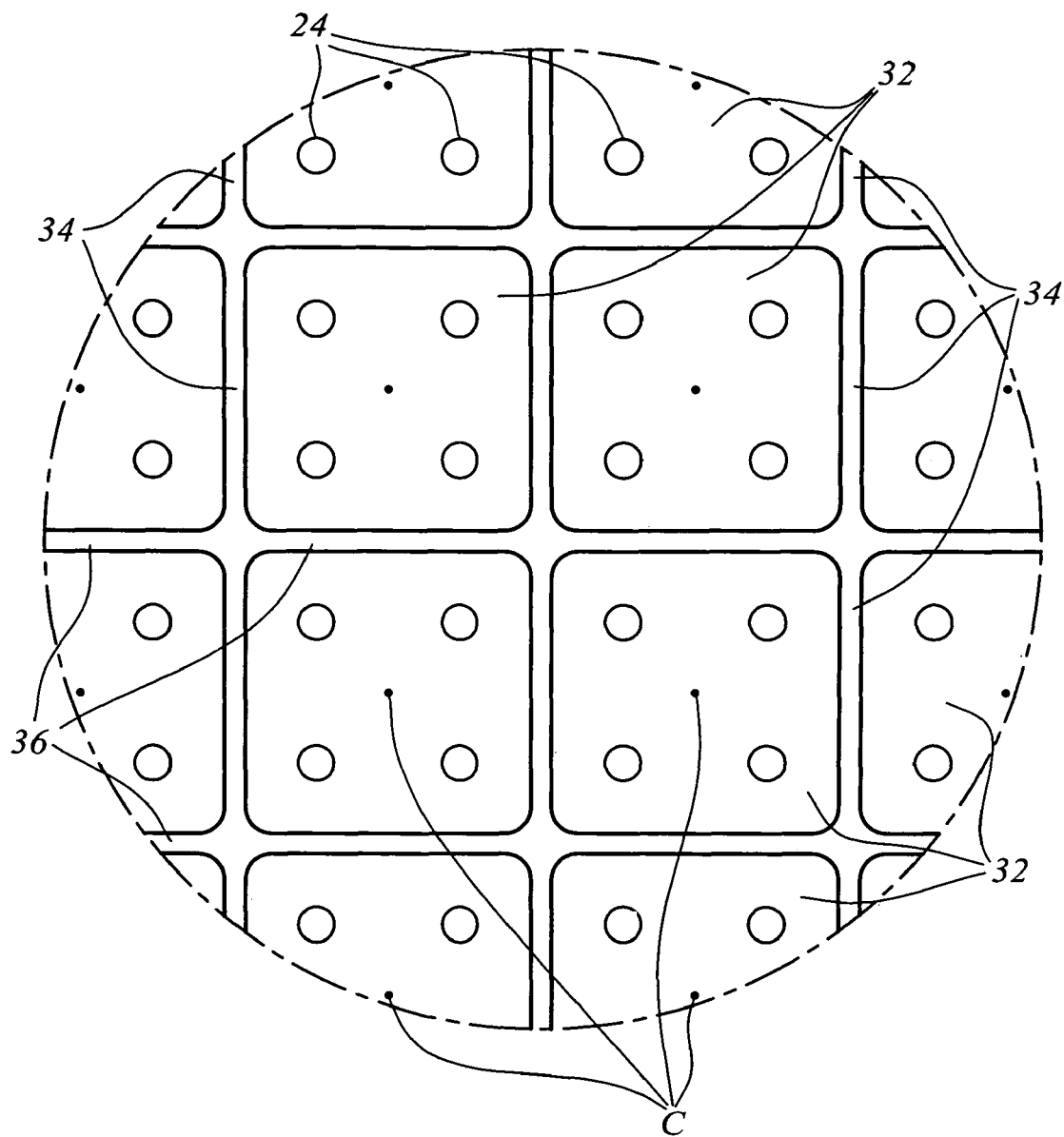
FIG. 4 is an enlarged view of a detail IV of FIG. 2 on which the positions of the holes for circulation of the primary coolant through the core support plate and the positions of the centre axes of the nuclear fuel assemblies are superimposed.

The respective positions of the blades 34 and 36, the circulation holes 24 and the centre axis C of the nuclear fuel assemblies, taken along the axis X are illustrated in FIG. 4. It can be seen that the axes C occupy the centre of the square holes 32 delimited by the blades 34 and 36. Four holes 24 are arranged on the diagonal lines of each square hole 32, halfway between the corners of the hole and the axis C.

As can be seen in FIG. 2, all the calming holes 32 arranged in the centre portion of the calming plate 30 have a square cross-section. These holes 32 extend through the calming plate over the entire height thereof, parallel with the centre axis X. They are all the same size.

However, the holes 32 which are located at the periphery of the plate 30 have different shapes. These holes are delimited inside the plate 30 by the blades 34 and 36 and at the radially outer side of the plate 30 by the cylindrical portion 28.

The calming plate 30 is circular and has, in a plane perpendicular relative to the centre axis X, a diameter of between 30% and 60% of the inner diameter of the shell 4.

Furthermore, the calming plate 30 has, along the centre axis X, a height h of between 15% and 40% of the maximum height H of the vessel bottom head space 14 (see FIG. 1). The maximum height H corresponds to the distance which separates a lower face of the core support plate 12 from the inner surface of the dished bottom head 6 at the centre axis X of the vessel.

The height h of the plate 30 is between 0.3 and 3.5 times the largest dimension of the cross-section of the holes 32 taken perpendicularly relative to the axis X. Preferably, the height h is between 0.5 and 2 times the largest dimension, and is typically 1 times the largest dimension.

The distance between the lower face of the core support plate 12 and the upper face of the calming plate 30 is between 10% and 35% of the maximum height H of the vessel bottom head space 14.

As can be seen in FIG. 3, the cylindrical portion 28 of the calming device extends towards the core support plate 12 beyond the upper face 37 of the calming plate 30. Relative to the upper face 37, the cylindrical portion 28 protrudes over a height which is between 25% and 100% of the height of the calming plate 30.

The diameter of the calming plate 30 is, for example, approximately 2610 mm. The outer diameter of the cylindrical portion 28 is, for example, 2690 mm. The height of the calming plate 30 is, for example, 280 mm. The total height of the cylindrical portion 28 is, for example 430 mm.

The pitch which separates two blades 34 or two blades 36 is approximately 215 mm, for example. The blades have a thickness of between 5 mm and 50 mm, and preferably substantially equal to 15 mm. The length of the side of the holes 32 is in this case approximately 200 mm, the largest dimension of the cross-section of the holes 32 being approximately 280 mm (diagonal of the square cross-section).

The calming device 26 is fixed to the core support plate 12 by means of twenty-four columns 38 which extend parallel with the centre axis X. These columns 38, as illustrated in FIG. 1, are rigidly fixed, at a lower end, to the plate 30, and at an upper end, to the plate 12.

To this end, enlarged nodes 40 are provided at the intersection of specific blades 34 and 36. These enlarged nodes 40 are perforated with bores 42 which extend parallel with the centre axis X. The lower portions of the columns 38 are shaped in the form of threaded rods (not illustrated). These rods are engaged in the bores 42 through which they extend axially from one side to the other. Nuts 43 (FIG. 1) are screwed to the free ends of the threaded rods which protrude below the plate 30. The connection between the columns 38 and the calming plate 30 is further reinforced by weld points or seams which are produced between the nuts and the edges of the bores 42.

As can be seen in FIG. 2, the bores 42 are arranged at the periphery of the calming plate 30, immediately inside the cylindrical portion 28. The columns 38 are distributed at regular intervals about the centre axis X.

An upper end of each column 38 is shaped in the form of a cross-shaped plate 44 (FIG. 1), which extends perpendicularly relative to the axis X. The upper face of this cross-shaped plate carries, at its centre, a centering pin, four fixing holes being arranged in the four branches of the cross-shaped plate. These cross-shaped plates 44 are pressed, with the upper faces thereof, against the core support plate 12, the centering pins engaging in housings which are provided at the lower face of the plate 12 for this purpose. Screws 45 (FIG. 1) extend through the holes of the cross-shaped plate and are engaged in corresponding threaded holes provided on the lower face of the plate 12. The positions of the threaded holes are selected so that the column 38 is positioned at the centre of a square mesh of the grid of circulation holes 24. In the same manner as before, weld points or seams allow the connection to be reinforced between the cross-shaped plate 44 and the lower face of the core support plate 12.

The circulation of the primary coolant inside the vessel of the invention will now be described.

The primary coolant is generally water. It is delivered by the primary pumps of the reactor and is introduced into the vessel 1 via the inlets which are provided in the fabricated casing 2. The primary water then circulates downwards into the annular space 18, as far as the vessel bottom head space 14. A small portion of the water, leaving the annular space 18, passes directly between the calming device 26 and the core base plate 12, without passing through the calming device. This small portion of the water is then introduced inside the core 8 of the reactor, passing through the holes 24 of the plate 12.

The majority of the primary water, leaving the annular space 18, flows along the dished bottom head 6, then rises parallel with the axis X, through the calming device 26. The water passes through the calming holes 32, then continues its upward movement passing through the circulation holes 24 of the plate 12.

The primary water then rises along the nuclear fuel assemblies 10 and becomes hot in contact therewith. It leaves the vessel 1 via the outlets which are provided in the fabricated casing 2.

The vessel described above has a number of advantages.

The structure of the calming device (plate which is perforated with a plurality of holes) allows it to break very effectively the small vortexes which are formed in the primary coolant which enters the vessel bottom head space or which develops in the vessel bottom head space at the point of intersection of the currents originating from different inlets of the vessel.

Furthermore, the selection of the dimensions of the calming device perpendicularly relative to the centre axis of the vessel contributes to making it particularly effective.

The fact that the calming holes are delimited by mutually perpendicular blades which are provided in the calming plate leads to a very good compromise between the effectiveness of the calming of the fluid and the pressure drop experienced by this fluid passing through the plate. This allows the pressure of the primary pumps to be limited as a last resort.

The arrangement of the blades relative to the holes for passage of the primary coolant through the core support plate allows the circulation of the fluid to be facilitated in the vessel.

Furthermore, the height of the calming plate and the thickness of the blades are selected in ranges which contribute to improving the compromise between the transparency of the calming plate, the efficiency of the calming and the mechanical strength of the calming device.

The relationship between the height of the plate and the largest dimension of the cross-section of the holes of this plate is also optimised in order to improve the efficiency of the calming.

The calming device is suspended below the core support plate and can therefore be removed from the vessel of the reactor with the sub-assembly constituted by the screen 16 and the plate 12.

The outer cylindrical portion which surrounds the calming plate and which extends beyond the calming plate to the core support plate allows the primary coolant to be channelled which leaves the calming holes and which flows towards the core support plate and allows the turbulences in this fluid to be limited.

When the vessel is used in a reactor which comprises a plurality of primary loops (typically 4), each of which is associated with an inlet and an outlet of the vessel, it has been found that the calming device was particularly effective when the circulation in one of the loops is interrupted. The inlets are generally distributed over the vessel so that the circulation in the annular space 18 which leads to the vessel bottom head space is uniform over the entire periphery of this space 18. The loss of one of the primary loops brings about asymmetry in the circulation of the fluid in the annular space so that it creates a number of vortexes in the primary coolant entering the vessel bottom head space. The calming device described above allows these vortexes to be broken in an extremely effective manner.

Arranging the calming device in a remote position below the core bottom plate is particularly advantageous. It is known that it is desirable to distribute the flow of cooling water in the most homogeneous manner possible in all of the openings which extend through the core support plate 12 so as to provide an optimum supply to each of the assemblies of the core of the nuclear reactor. However, inside the vessel bottom head space 14, the flow of pressurised cooling water of the reactor is subjected to a high level of interference and in particular occurrences of turbulence are capable of being formed in the circulation of the fluid before it is introduced into the core 8 through the core support plate 12.

The distribution of flow rate and pressure at the inlet of the core is therefore subject to a high level of interference and the range of the pressures and flow rates generally has a low level of uniformity if the flow has not been calmed inside the vessel bottom head space 14, that is to say, clearly before the water arrives at the level of the core support plate 12.

The vessel described above may have a number of variants.

It is possible for the calming device not to comprise an outer cylindrical portion which surrounds the calming plate. The calming device may also comprise an outer cylindrical portion which has a height which is substantially equal to that of the plate, this outer cylindrical portion thus not extending beyond the calming plate to the core support plate.

The calming plate 30 cannot have a circular form perpendicularly relative to the centre axis X. It may be square, rectangular, oval or any other shape which allows a high level of, efficiency to be obtained for the calming of the primary coolant. In all cases, the dimensions of the plate in directions perpendicular relative to the centre axis remain between 30% and 60% of the inner diameter of the shell of the fabricated casing.

The calming device may comprise a plurality of planar plates which are fixed to each other. Each plate has the structure described above, and is provided with blades which are perpendicular relative to each other and which delimit calming holes of the primary coolant. These various plates are arranged perpendicularly relative to the centre axis of the vessel, in the same plane. Each plate can be surrounded by a cylindrical portion which extends beyond this plate to the core support plate.

It is possible for the calming plate not to be a machined forged component but rather a mechanically welded structure.

The calming plate can be fixed to the core support plate by means different from the fixing columns described above, for example, welded cross-members, provided that these means allow a sufficiently strong connection between the two plates.

The blades 34 and 36 can be arranged in accordance with a different pitch at the side of the square meshes of the grid of the fuel assembly grid. In this instance, a whole multiple constant pitch of half of the side is selected. Preferably, a pitch is selected which is between one and six times one half of the side. It is thus possible to pass the blades 34 and 36 between the rows of circulation holes 24 of the support plate without blocking them, even partially.

The blades 34 of the first set are not necessarily perpendicular relative to the blades 36 of the second set but may extend in directions which are inclined relative to the blades 36, the blades 34 intersecting with the blades 36. In this manner, the holes 32 which are provided in the plate 30 are not necessarily square. They may have a variety of different shapes: rectangular, round, oval or another shape. So as to ensure correct operation of the calming device, it is important for these holes to be distributed over the entire surface of the plate 30, preferably in a uniform manner. To this end, it is particularly advantageous to arrange them in a grid having a constant mesh. This mesh can be square, triangular, diamond-shaped or have another shape provided that it is adapted to the shape of the holes. The holes must have small cross-sections in order to effectively break the small vortexes and there must be enough of them for the transparency of the plate to be high, and for the primary coolant not to be subjected to a high pressure drop when passing through the plate.

The invention claimed is:

1. A pressurised water nuclear reactor vessel comprising:
    an outer casing which comprises at least one cylindrical shell having a circular cross-section, with a vertical centre axis, and a dished bottom head which closes a lower end of the shell,
    a primary cooling fluid, in the casing,
    a core comprising a plurality of nuclear fuel assemblies, arranged inside the casing,
    a core support plate which is substantially perpendicular relative to the centre axis and which is arranged inside the casing beneath the core, a vessel bottom head space being delimited between the support plate and the dished bottom head, the support plate being perforated with holes for circulation of the primary cooling fluid which place the vessel bottom head space in communication with the core,
    means for channelling the primary cooling fluid from the inlet(s) as far as the vessel bottom head space,
    a calming device which is arranged beneath the support plate in the vessel bottom head space and which is capable of calming at least a portion of the primary cooling fluid conveyed by the channelling means before this fluid passes through the support plate, the calming device having, in directions perpendicular relative to the centre axis, dimensions of between 30% and 60% of the inner diameter of the shell,
    wherein the calming device comprises at least one calming plate which is substantially perpendicular relative to the centre axis, and a plurality of calming holes, the calming holes being provided in the calming plate and being capable of calming the primary cooling fluid by passing it through the calming holes and the calming plate and the calming holes have, along the centre axis, a height of between 15% and 40% of the maximum height of the vessel bottom head space, taken along this axis.

2. The vessel according to claim 1, wherein the calming plate is unitary.

3. The vessel according to claim 2, wherein the calming plate is a machined forged component.

4. The vessel according to claim 1, wherein the calming holes extend through the calming plate parallel with the centre axis and are distributed in the form of a square-mesh grid.

5. The vessel according to claim 4, wherein the calming holes have a square cross-section perpendicularly relative to the centre axis.

6. The vessel according to claim 5, wherein the calming holes are delimited at least by a first set of mutually parallel blades which belong to the calming plate, and by a second set of mutually parallel blades which belong to the calming plate, the blades of the first set being perpendicular relative to the blades of the second set.

7. The vessel according to claim 6, wherein the first and second set of mutually parallel blades are straight and each extend through the entire calming plate in a direction which is perpendicular relative to the centre axis.

8. The vessel according to claim 7, wherein the fuel assemblies are arranged in the core in accordance with a square-mesh grid, each square mesh within the square-mesh grid having an equal and predetermined side measurement, the mutually parallel blades of the first set being arranged in accordance with a whole multiple constant pitch of half of the predetermined side measurement, the mutually parallel blades of the second set also being arranged in accordance with a whole multiple constant pitch of half of the predetermined side measurement.

9. The vessel according to claim 6, wherein each of the mutually parallel blades in the first set and in the second set has a thickness of between 5 and 50 millimetres.

10. The vessel according to claim 6, wherein the calming device comprises columns for fixing the calming plate to the core support plate, these columns being rigidly fixed to nodes of the calming plate which are provided at the intersection of blades of the first and second sets assemblies.

11. The vessel according to claim 5, wherein the calming plate has, along the centre axis, a height of between 0.3 and 3.5 times the largest dimension of the cross-section of the calming holes, taken perpendicularly relative to the centre axis.

12. The vessel according to claim 1, wherein the calming device comprises a cylindrical portion which surrounds the calming plate and which is fixedly joined to the an outer edge of the calming plate.

13. The vessel according to claim 12, wherein the cylindrical portion extends along the centre axis beyond the calming plate towards the core support plate, over a height of between 25% and 100% of the height of the calming plate.

14. The vessel according to claim 1, wherein the calming holes are distributed over an entire surface cross section of the calming plate that is perpendicular to the central axis.

* * * * *